United States Patent
Peters et al.

(10) Patent No.: US 9,615,592 B2
(45) Date of Patent: Apr. 11, 2017

(54) COMBINATION OF A CONVEYING DEVICE FOR SLAUGHTER ANIMALS AND REMOVING DEVICE, AS WELL AS A METHOD FOR OPERATING SUCH COMBINATION

(71) Applicant: MAREL STORK POULTRY PROCESSING B.V., AV Boxmeer (NL)

(72) Inventors: Erik Hendrikus Werner Peters, Boxmeer (NL); Tim Sander Rijerse, Gemert (NL)

(73) Assignee: MAREL STORK POULTRY PROCESSING B.V., Boxmeer (NO)

( * ) Notice: Subject to any disclaimer, the term of this patent is extended or adjusted under 35 U.S.C. 154(b) by 0 days.

(21) Appl. No.: 15/102,815

(22) PCT Filed: Dec. 11, 2014

(86) PCT No.: PCT/NL2014/050851
§ 371 (c)(1),
(2) Date: Jun. 8, 2016

(87) PCT Pub. No.: WO2015/088340
PCT Pub. Date: Jun. 18, 2015

(65) Prior Publication Data
US 2017/0020145 A1 Jan. 26, 2017

(30) Foreign Application Priority Data
Dec. 12, 2013 (NL) ...................................... 2011946

(51) Int. Cl.
*A22C 21/00* (2006.01)
(52) U.S. Cl.
CPC ................................ *A22C 21/0053* (2013.01)

(58) Field of Classification Search
CPC .... A22C 21/00; A22C 21/007; A22C 21/0053
(Continued)

(56) References Cited

U.S. PATENT DOCUMENTS

| | | | | |
|---|---|---|---|---|
| 5,453,045 A | * | 9/1995 | Hobbel | A22C 21/0053 452/182 |
| 5,890,956 A | * | 4/1999 | Habenicht | A22C 21/0023 452/154 |

(Continued)

FOREIGN PATENT DOCUMENTS

| | | |
|---|---|---|
| EP | 1922935 A1 | 5/2008 |
| NL | 8902847 A | 6/1991 |

OTHER PUBLICATIONS

International Search Report, International Patent Application No. PCT/NL2014/050851, mailed Mar. 6, 2015.

*Primary Examiner* — Richard Price, Jr.
(74) *Attorney, Agent, or Firm* — Casimir Jones, S.C.

(57) ABSTRACT

The invention provides a combination of a conveying device for slaughter animals and a removing device (15). The conveying device comprises a guide (2) extending along a transport path, product carriers (3) for the slaughter animals, which are movable in a direction of movement along the guide, each product carrier comprising at least one groove inclined according to a direction of inclination for holding at least one held part of a slaughter animal therein. The at least one groove has an open upper end and a lower end. The removing device comprises a pusher element, which is movable to and fro between a passive position and an active position for pushing the at least one held part out of the at least one groove. The removing device comprises a further pusher element which is movable to and fro between a further passive position and a further active position. The pusher element is designed to push the at least one held part of a slaughter animal from the intermediate position, via the (Continued)

upper end of the at least one groove, out of said at least one groove in the active position or during its movement from the passive position to the active position.

24 Claims, 7 Drawing Sheets

(58) Field of Classification Search
USPC .......................................... 452/177, 182, 183
See application file for complete search history.

(56) References Cited

U.S. PATENT DOCUMENTS

| | | | | |
|---|---|---|---|---|
| 6,033,299 | A * | 3/2000 | Stone | A22C 21/0053 452/182 |
| 6,179,701 | B1 * | 1/2001 | Tieleman | A22C 21/0053 452/179 |
| 7,004,930 | B2 * | 2/2006 | Marshall | A61M 5/46 604/198 |

* cited by examiner

COMBINATION OF A CONVEYING DEVICE FOR SLAUGHTER ANIMALS AND REMOVING DEVICE, AS WELL AS A METHOD FOR OPERATING SUCH COMBINATION

The present invention relates to a combination of a conveying device for conveying slaughter animals suspended from product carriers of the conveying device, during which conveyance the slaughter animals describe a path, and a removing device disposed along said path for removing selected slaughter animals from the product carriers, the conveying device comprising a guide extending along a transport path, product carriers for the slaughter animals, which are movable in a direction of movement along the guide, each product carrier comprising at least one groove inclined according to a direction of inclination for holding at least one held part of a slaughter animal therein, wherein the at least one groove has an open upper end and a lower end and is laterally oriented relative to the conveying device, at least at the location of the removing device, the removing device comprising a pusher element, moving means for moving the pusher element to and fro between a passive position, in which the pusher element is located outside the path of slaughter animals, and an active position, in which the pusher element is located in the path of at least one held part of a selected slaughter animal in the active position, or at least during movement from the passive position to the active position, for pushing the at least one held part of the selected slaughter animal out of the at least one groove of a product carrier via the upper open end of said at least one groove.

BACKGROUND OF THE INVENTION

In slaughterhouses, where slaughter animals suspended from product carriers of a conveying device are processed, there is a continuous pursuit of increasing the capacity. Modern slaughter lines for slaughter birds are capable of processing typically at least 12,000 birds per hour, for example, but even higher capacities are considered to be desirable with a view to reducing the cost involved in the processing of slaughter birds. Various possibilities, whether or not in combination with each other, are available for increasing the capacity of a slaughterhouse. A first possibility is to increase the speed of the conveying device by means of which the slaughter animals are conveyed through a slaughterhouse, during which conveyance the slaughter animals are processed. A second possibility is to reduce the pitch between successive product carriers. In slaughterhouses it may for several reasons be necessary to selectively remove slaughter animals, such as birds, from a product carrier at the location of a processing position. The term "selective" indicates that only selected slaughter animals are to be removed from the product carrier at the location of the processing position, whilst for example the slaughter animals in an adjacent upstream product carrier and an adjacent downstream product carrier must not be removed from said product carrier at the location of said processing position. Such a selection may for example take place on the basis of the weight of the slaughter animal or on the basis of a visual assessment of a slaughter animal. A transfer situation may occur, in which a slaughter animal is transferred from one product carrier to another product carrier. Alternatively, specific slaughter animals may fall from a product carrier into a collecting bin or onto a further conveyor, such as a belt conveyor.

When relatively high speeds of the conveying device are used, there is an increased risk that the at least one held part of slaughter animals will slip out of the at least one groove of a product carrier, in particular in bends in the conveying line. For that reason it may be desirable to use a relatively large angle between a horizontal line and the direction of inclination, being the direction in which the at least one groove extends, and/or to use a relatively long groove. Alternatively, or in combination, it is also conceivable to dimension and/or configure the grooves to have a slight local constriction of the width of the grooves, so that the held parts, such as typically a bird's legs in the case of birds, are held in the lower end of a groove with a slight clamping fit and/or a more or less form-locked fit.

All the above possible aspects connected with increasing the capacity of a slaughterhouse in themselves make it more difficult to selectively remove slaughter animals from a product carrier. On the one hand this is the case because the use of product carriers that may have been adapted in the above-described manner with a view to realising higher line speeds makes it more difficult to remove slaughter animals from the product carriers, whilst on the other hand higher line speeds and or smaller pitches increase the risk that a pusher element by means of which a slaughter animal is removed from a product carrier, more specifically by means of which the at least one held part of a slaughter animal is pushed out of at least one slot of a product carrier, will undesirably collide with a slaughter animal suspended from an adjacent upstream or downstream product carrier. Accelerating the stroke of the pusher element will increase the impulse that acts on the at least one held part of the slaughter animal, so that there is an increased risk of damage to the slaughter animal and of undesirable bone fractures.

European publication EP 1 922 935 A1 describes a combination according to the introduction, wherein the moving means comprise a stepping motor or a servomotor and wherein it is possible to impart a movement or speed pattern to the pusher element, which is claimed to make the combination more suitable for high-speed operation. Apart from the fact that this is a relatively costly solution, the magnitude of the positive effect that may be achieved is moreover limited.

BRIEF SUMMARY OF THE INVENTION

The object of the invention is to provide a solution or at least an improvement as regards such problems. In order to achieve that object, the invention provides a combination as described in the introduction, wherein the removing device comprises a further pusher element as well as further moving means for moving the further pusher element to and fro between a further passive position, in which the further pusher element is located outside the path of slaughter animals, and a further active position, in which the further pusher element is located in the path of the at least one held part of the selected slaughter animal in said further active position, or at least during its movement from the further passive position to the further active position, for pushing the at least one held part of the selected slaughter animal from the lower end, in the direction of the upper end, to an intermediate position, wherein the pusher element is designed to push the at least one held part of a slaughter animal from the intermediate position, via the upper end of the at least one groove of a product carrier, out of said at least one groove in the active position or during its movement from the passive position to the active position.

The use of a further pusher element, in combination with a pusher element that is known per se, creates the possibility that initially the at least one held part is pushed from the lower end of the at least one slot in the direction of, but not as far as, the upper end of the at least one slot, after which the pusher element will push the at least one held part from the position of the at least one held part in the at least one slot effected by the further pusher element past the upper end of the at least one slot, and thus out of the at least one slot. The advantage of using a further pusher element may be that the pusher element will need less force for pushing the at least one held part of a slaughter animal, such as a bird's legs, past the upper end of the at least one slot, so that there will be a decreased risk of damage to the slaughter animal. The advantage of using a further pusher element may also be that as soon as the further pusher element has pushed the at least one held part of the slaughter animal out of the lower end of the at least one slot, and a first part of the movement of the at least one held part that is needed for removing the slaughter animal from the product carrier has thus been carried out, and preferably as soon as the pusher element subsequently comes into contact with the at least one held part or at least with one held part in the case of two or more held parts, the further pusher element can be moved back to the further passive position. The risk of a slaughter animal in an adjacent upstream product carrier undesirably coming into contact with the further pusher element can thus be considerably reduced, in spite of the fact that the pusher element is still engaged in pushing the at least one held part of the slaughter animal out of the at least one slot, and in spite of the fact that a relatively high line speed and/or a small pitch between the product carriers is/are used. On the other hand, the pusher element need not move from the passive position to the active position until the further pusher element has been moved to the active position. This, too, reduces the risk of a slaughter animal in an adjacent downstream product carrier undesirably coming into contact with the pusher element.

An embodiment of the invention that is advantageous for reasons of constructional simplicity is obtained if the pusher element is pivotable about a pivot axis between the passive position and the active position.

In an advantageous embodiment, such a pivot axis may extend parallel to the direction of movement. In such a variant, pushing the legs of a slaughter animal of the slots of the product carrier in lateral direction relative to the conveying direction can take place in that the pusher element exerts an impact load on the at least one held part. The movement of the at least one held part in the direction of the open end of the at least one slot is thus obtained during movement of the pusher element from the passive position to the active position.

Alternatively it may also be advantageous within the scope of the invention if the pivot axis extends at least substantially perpendicular to the direction of movement. In such a configuration it is more logical if the movement of the at least one held part in the direction of the open end of the at least one slot is obtained whilst the pusher element is in the passive position. The pusher element will in that case function as a guide element, which urges the at least one held part of the slaughter animal sideways in the direction of and past the open end of the at least one slot.

If the pivot axis moreover extends perpendicular to, at least substantially so, the direction of inclination, it will be easy to effect a situation in which the pusher element moves closely past the bottom side of the at least one slot, for example at a distance of at most 5 cm, or even more preferably at most 2 cm, upon pivoting between the passive position and the active position. This is advantageous with a view to reducing moments that act on the at least one held part when the slaughter animal is pushed sideways by the pusher element.

If the pivot axis is provided on an upstream side of the pusher element, the additional advantage will be that the risk of a next slaughter animal undesirably colliding with the pusher element is further reduced and/or that the magnitude of the pivot angle between the passive position and the active position can be relatively small.

The invention can in particular, but not exclusively, be used advantageously if the direction of inclination includes an angle that ranges between 40 degrees and 50 degrees with a horizontal line. The at least one groove will in that case extend at a relatively steep angle, as a result of which the product carriers in question can be suitable for being operated at a relatively high line speed, for example of 18,000 slaughter animals per hour.

The further pusher element may be pivotable about a further pivot axis between the further passive position and the further active position, which may be advantageous also for reasons of constructional simplicity.

As was the case with regard to the pivot axis as described above, it may also be advantageous for the further pivot axis if the further pivot axis extends at least substantially perpendicular to the conveying direction and furthermore preferably at least substantially perpendicular to the direction of inclination.

From the viewpoint of the preparatory function of the further pusher element with a view to moving held parts of slaughter animals entirely out of the slots it may be advantageous if the further pusher element, in the further passive position thereof, is located at least partially upstream of the pusher element in the passive position thereof.

If, according to a possible embodiment, the pusher element, at least in the active position thereof, and/or the further pusher element, in the further active position thereof, is/are designed for laterally guiding the at least one held part of a selected slaughter animal in the direction of the open end of the at least one groove of a product carrier during transport of the slaughter animal in the direction of movement, to which end the pusher element and/or the further pusher element comprise a guide surface and/or a further guide surface, respectively, wherein, seen in top plan view, the guide surface and/or the further guide surface include(s) an acute angle with the conveying direction in the active position and/or the further active position, respectively, it is possible to obtain the advantage that the mechanical load exerted on the slaughter animal, more specifically on the at least one held part thereof, upon removal of the slaughter animal from the product carrier will be limited. The additional advantage is moreover the fact that contact between the pusher element or the further pusher element and a non-selected slaughter animal suspended from a next (upstream) product carrier need not directly result in damage to the slaughter animal in question.

An effective removal of a slaughter animal from a product carrier can be obtained in particular if the pusher element, in the active position thereof, and the further pusher element, in the further active position thereof, are designed for laterally guiding the at least one held part of a selected slaughter animal, wherein the angle which the guide surface includes with the conveying direction is larger than the angle which the further guide surface includes with the conveying direction. In such an embodiment, the speed at which a slaughter animal is pushed sideways by the further pusher element will initially be lower than at a later stage, when the slaughter animal is pushed sideways by the pusher element. Said larger angle has the advantage that the legs are pushed out of the slots more quickly, and thus within a relatively shorter conveying length, by the pusher element in comparison with the further pusher element, which need not be problematic if the configuration of the slots makes it possible that the legs are moved through the slots by the pusher element with less resistance than the resistance that the legs experience upon being moved through the slots by the further pusher element. The reason for this may be that the slots diverge in the direction of the upper ends and/or that only the lower ends of the legs are held in the slots with a slight clamping fit or in a more or less form-locked manner.

An advantageous embodiment of the invention can likewise be obtained if the pusher element comprises a guide surface as well as a connecting surface that joins the guide surface on the upstream side of the guide surface, which connecting surface, seen in top plan view in the active position of the pusher element, includes an angle with the conveying direction which is larger than the angle which the guide surface includes with the conveying direction. Thus, the situation in which the guide surface of the pusher element joins the further guide surface of the further pusher element for taking over the guiding function can be realised more quickly during pivoting of the pusher element to the active position.

The invention is quite suitable, but not exclusively so, for use in transferring slaughter animals from one product carrier to another product carrier, which will usually be of a different type. In that case the slaughter line will comprise further product carriers which are movable along a further conveying path, which further product carriers are designed for taking over the slaughter animals whose at least one held part is being pushed out of the at least one groove by the pusher element via the upper end of the at least one groove of a product carrier.

The invention is also quite suitable, but not exclusively so, for use with slaughter animals having at least two legs, such as in particular slaughter birds. For the processing of such slaughter birds it is preferable that each product carrier comprises two grooves. In said two grooves, the legs, being the held parts of the slaughter words, can be received.

The slaughter line according to the invention can be used advantageously in particular if the moving means and the further moving means are designed to carry out the following steps for the purpose of pushing the at least one held part of a slaughter animal out of the at least one groove A moving the further pusher element from the further passive position to the further active position for pushing the at least one held part of a slaughter animal from the lower end of the at least one groove in the direction of the upper end of the at least one groove to an intermediate position during step A or because of step A, B moving the pusher element from the passive position to the active position after step A for pushing the at least one held part of slaughter animal from the intermediate position, via the upper end of the at least one groove of a product carrier, out of said at least one groove during step B or because of step B, C moving the further pusher element from the further active position back to the further passive position after step B, D moving the pusher element from the active position back to the passive position after step B.

The moving means and the further moving means may to that end comprise a control unit, such as a PLC control unit, for example, but a purely mechanical solution, for example using a cam disc, is also conceivable. Using the further pusher element and the pusher element, a two-stage approach is obtained, as it were, for moving the at least one held part of a slaughter animal out of the at least one slot from the lower end to the upper end. The invention makes it possible for the further pusher element to have returned to the further passive position, thus providing space for a next slaughter animal, while the pusher element is still in the active position and is operative for completely pushing the at least one held part of a slaughter animal out of the at least one slot of a product carrier, making it possible to use relatively high line speeds or a relatively small pitch between adjacent product carriers.

The invention further provides a method for operating a combination of a conveying device and a removing device according to the invention as described in the foregoing. The method comprises the steps of A moving the further pusher element from the further passive position to the further active position for pushing the at least one held part of a slaughter animal from the lower end of the at least one groove in the direction of the upper end of the at least one groove to an intermediate position during step A or because of step A, B moving the pusher element from the passive position to the active position after step A for pushing the at least one held part of slaughter animal from the intermediate position, via the upper end of the at least one groove of a product carrier, out of said at least one groove during step B or because of step B, C moving the further pusher element from the further active position back to the further passive position after step B, D moving the pusher element from the active position back to the passive position after step B.

It is possible to carry out step D after step C, which can be an advantage is in particular if both the further pusher element and the pusher element function as guide means for pushing a bird's legs laterally out of the slots.

In particular in the case of the above possibility it may be advantageous if the length of the time interval between steps A and C and/or the length of the time interval between steps B and D is at most 80%, more preferably at most 75%, of the length of the time interval between steps A and D. Qualitatively it could be said that the more the above percentage decreases, the greater the advantages of the invention as regards the possibilities of operating conveying devices at higher speeds and/or width smaller pitches between the product carriers will be.

Alternatively it is also quite possible, however, for step B to be carried out simultaneously with or even (shortly) before step C. This can be an advantageous possibility if the pusher element pushes the at least one held part out of the at least one slot with a bump upon moving from the passive position to the active position.

An advantage use of the invention can be obtained if a slaughter animal is taken over from a product carrier by a further product carrier during step B or between steps B and D.

In general the invention can be used in the processing of slaughter animals, but it is in any case quite suitable for use with slaughter birds.

The invention further provides a removing device for use in a slaughter line according to the invention as described in the foregoing. Such a removing device comprises a pusher element, moving means for moving the pusher element to and fro between a passive position, in which the pusher element is located outside the path of slaughter animals, and an active position, in which the pusher element is located in the path of at least one held part of a selected slaughter animal in the active position, or at least during movement from the passive position to the active position, for pushing the at least one held part of the selected slaughter animal out of the at least one groove of a product carrier via the upper open end of said at least one groove, wherein the removing device comprises a further pusher element as well as further moving means for moving the further pusher element to and fro between a further passive position, in which the further pusher element is located outside the path of slaughter animals, and a further active position, wherein the further pusher element is located in the path of the at least one held part of the selected slaughter animal in said further active position, or at least during its movement from the further passive position to the further active position, for pushing the at least one held part of the selected slaughter animal from the lower end, in the direction of the upper end, to an intermediate position, wherein the pusher element is designed to push the at least one held part of a slaughter animal from the intermediate position, via the upper end of the at least one groove of a product carrier, out of said at least one groove in the active position or during its movement from the passive position to the active position.

The invention will be explained in more detail hereinafter by means of a description of non-limitative possible embodiments of the present invention, in which reference is made to the following figures:

BRIEF DESCRIPTION OF THE SEVERAL VIEWS OF THE DRAWING(S)

DETAILED DESCRIPTION OF THE INVENTION

Figure 1:
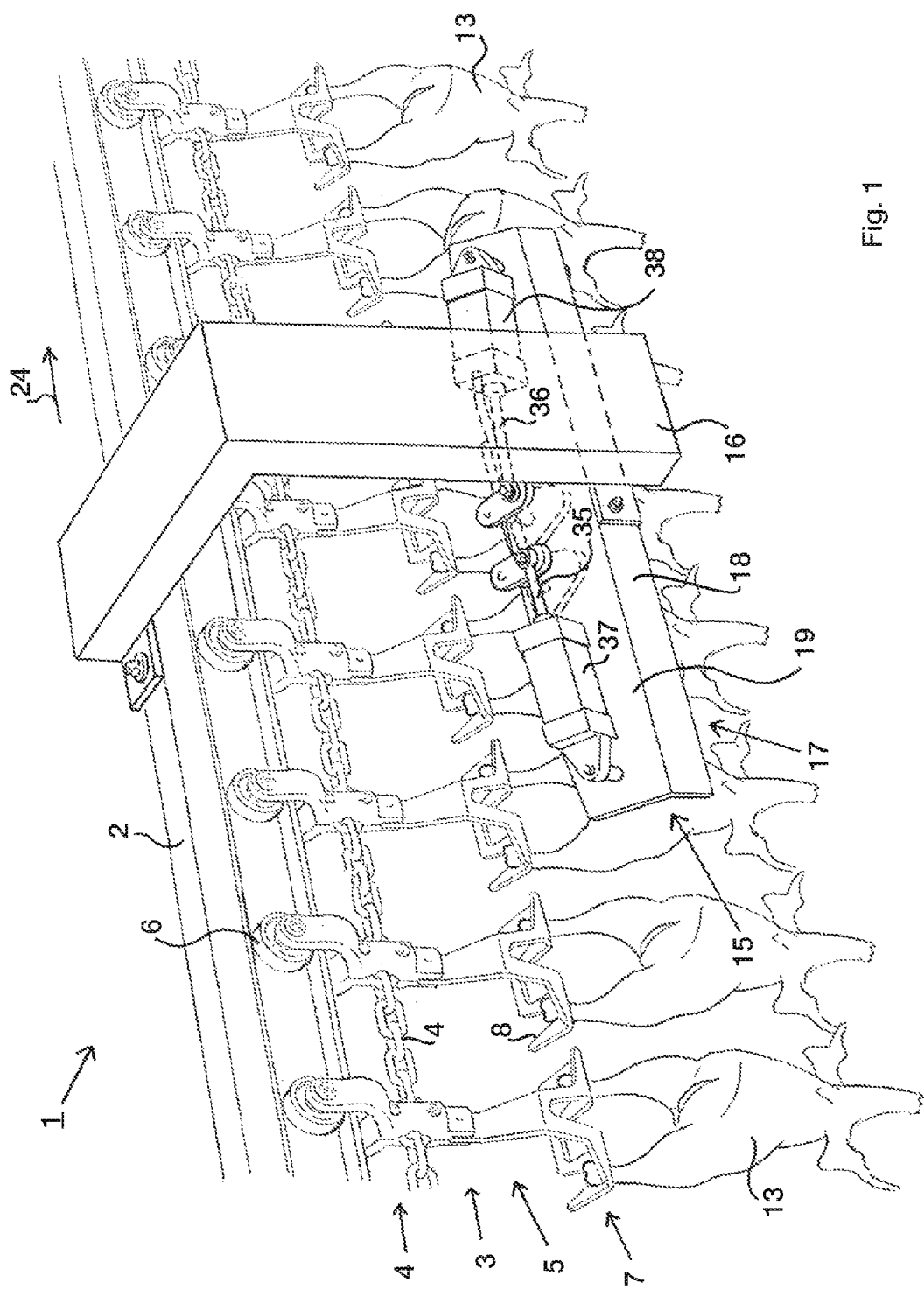
FIG. 1 shows a detail relevant to the invention of a slaughter line according to the invention, including the associated removing device according to the invention.

FIG. 1 shows a part of a slaughter line 1 which is provided with a guide rail 2 extending along a transport path. The slaughter line 1 further comprises product carriers 3 provided at regular intervals, which product carriers are interconnected via a conveyor chain 4. Each product carrier 3 is provided with a guide part 4 on the upper side and with a hook part 5 thereunder. The guide parts 4 are provided with running wheels 6, on which the product carriers 3 can roll in the direction of movement 24 along the guide rail 2 when the conveyor chain 4 is being driven. The pitch between adjacent product carriers 3 is 8 inches, or in other words, about 200 mm. Also other dimensions, such as 6 inches (152 mm), 8 inches) 203 mm), 10 inches (254 mm) or 12 inches (305 mm) are quite conceivable.

The hook part 5 has an at least substantially hooked J-shape (see also FIG. 3) and has a widened slot part 7 at the bottom end, in which two identically shaped slots 8 (see also FIGS. 2a-2d) are provided. The slots 8 each have a length I. The slot part 7 has a direction of inclination 9 (FIG. 3) that includes an angle α of 45° with a horizontal line that extends perpendicular to the direction of movement 24. The slots 8 each have a laterally facing open upper end 11 and a closed lower end 12. The slots 8 taper off slightly from the upper end 11 to the lower end 12 and have a constant width over a certain part of the length of the slots 8 at the lower end 12. Said width is adapted to the dimensions of bird legs, so that said legs can be accommodated in the lower end 12 with a slight clamping fit, such that the tarsal joint will remain above the lower end 12 of the slots.

The slaughter line 1 further comprises a removing device 15, which is rigidly suspended from the guide rail 2 via a support construction 16. The removing device 15 comprises a table body 17, which is rigidly connected, via an upright part 18, to the vertical part of the support construction 16, and which further comprises a tabletop 19. The tabletop 19 extends parallel to the direction of inclination 9 of the slot parts 7 that form part of hook parts 5 of passing product carriers 3. To selectively remove birds 13 from a passing product carrier 3, more specifically to push the legs of a bird 13 out of the slots 8 of an associated product carrier 3, as will be explained in more detail yet with reference to FIGS. 2a-2d, the removing device 15 comprises a first, upstream pusher arm 21 and a second, downstream pusher arm 22.

Figure 2A:
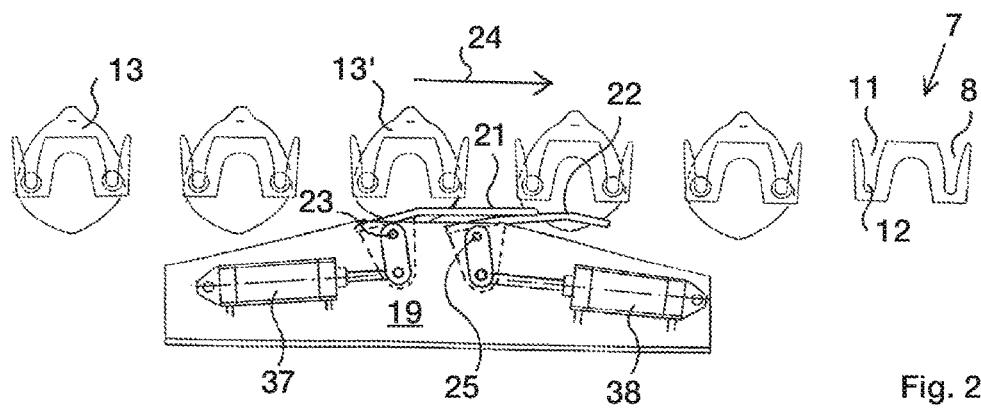
FIGS. 2a-2d show in top plan view four successive stages of the ejection of a bird from a product carrier by means of the removing device.
Figure 2B:
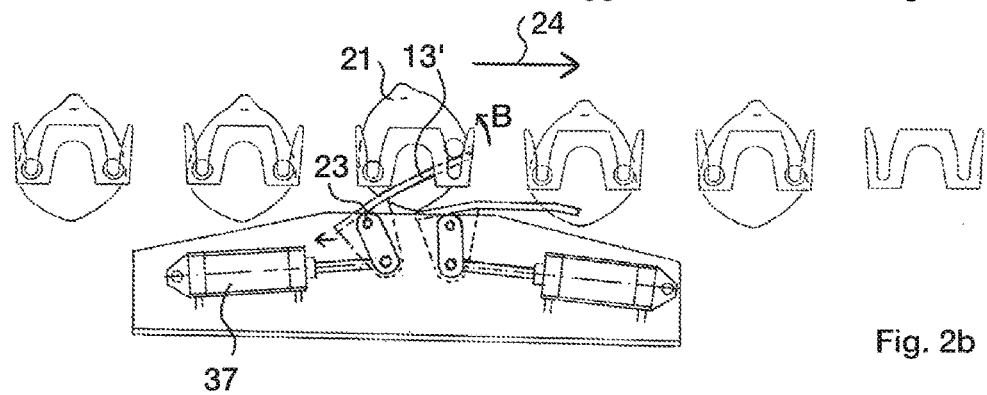

The first pusher arm 21 is connected to the tabletop 19 such that it can pivot to and fro, between a passive position and an active position, about a pivot axis 23 that extends perpendicular to the tabletop 19. In the passive position of the first pusher arm 21, as shown in FIGS. 2a and 2d, the first pusher arm 21 extends outside the path of birds 13 suspended from passing product carriers 3, more or less parallel to the conveying direction 24, on the downstream side of the pivot axis 23. In the active position shown in FIGS. 2b and 2c, the first pusher arm 21, or at least part thereof, is located in the path of passing birds 13, more specifically in the path of the legs 14 thereof. In the active position, the first pusher arm 21 extends at an angle of about 23 degrees relative to the conveying direction 24, seen in a direction perpendicular to a plane parallel to the table 19, or in other words, parallel to the slot part 7. In the active position, the end of the first pusher arm 21 is located approximately halfway the length of the slots 8, seen in top plan view. Exactly at that location, the slots 8 widen in the direction of the upper open ends 11.

The second pusher arm 22 is likewise connected to the tabletop 19 such that it can pivot to and fro between a passive position and an active position about a pivot axis 25, which likewise extends perpendicular to the tabletop 19. In the passive position of the second pusher arm 22, as shown in FIGS. 2a and 2d, the second pusher arm 22 extends outside the path of birds 13 suspended from passing product carriers 3, more or less parallel to the conveying direction 24, on the downstream side of the pivot axis 25. In the active position shown in FIGS. 2b and 2c, the second pusher arm 22, or at least part thereof, is located in the path of passing birds 13, more specifically in the path of the legs 14 thereof. In the active position, the second pusher arm 22 extends at an angle of about 33 degrees relative to the conveying direction 24, seen in a direction perpendicular to a plane parallel to the table 19, or in other words, parallel to the slot part 7. In the active position, the end of the second pusher arm 22 is located near the upper ends 11 of the slots 8, seen in top plan view, upon passage of the associated product carriers 3.

The pusher arms 21 and 22 are located under the tabletop 19 and are connected to an end of a connecting arm 33, 34 via respective shaft members 31, 32 which extend through the tabletop 19, being pivotally journalled therein. The central axes of the shaft members 31, 32 coincide with the respective pivot axes 23, 25. At the opposite end, the connecting arms 33, 34 are connected to the ends of piston rods 35, 36 associated with pneumatic cylinders 37, 38 which are connected to the tabletop 19 such that they can pivot to and fro about pivot axes 39, 40. Suitable actuation of the cylinders 37, 38, which can be individually controlled by means of a control unit (not shown), causes the associated pusher elements 21, 22 to pivot between the associated active and passive positions. The first pusher arm 21 is to a limited extent located closer to the tabletop 19 than the second pusher arm 22, so that there may be some overlap between the two pusher arms 21 and 22, as is shown in FIG. 2a and in particular in FIG. 2d.

Now the selective removal of a bird 13' from a product carrier 3, using the removing device 15, will be described.

The starting situation is the situation shown in FIG. 2a. The control system of the slaughter line 1 delivers a command to the control unit of the removing device 15 that an approaching bird 13' is to be removed from the associated product carrier 3. To that end the first pusher arm 21 is made to pivot from the passive position to the active position thereof (FIG. 2b) by suitable actuation of the cylinder 37 as soon as the adjacent downstream bird 13 offers space for such pivoting of the first pusher arm 21. The result of the pivoting of the first pusher arm 21 is that the first pusher arm 21 comes to lie in the path of the legs 14 of the bird 13', and because of the previously described inclined orientation of the first pusher arm 21 relative to the conveying direction 24, the legs 14 of the bird 13' are pushed sideways one after the other from the closed lower ends 12 of the associated slots 8 in the direction of the upper ends 11. The legs remain suspended in the slots 8, however.

Figure 2C:
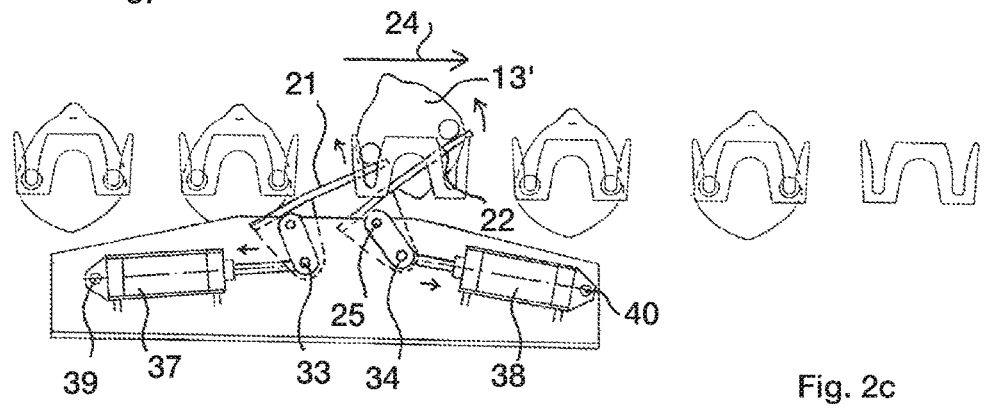
Figure 2D:
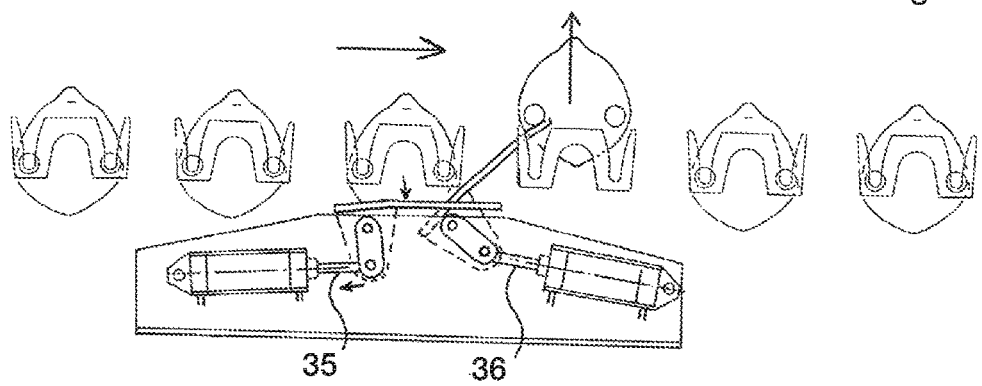
Figure 3:
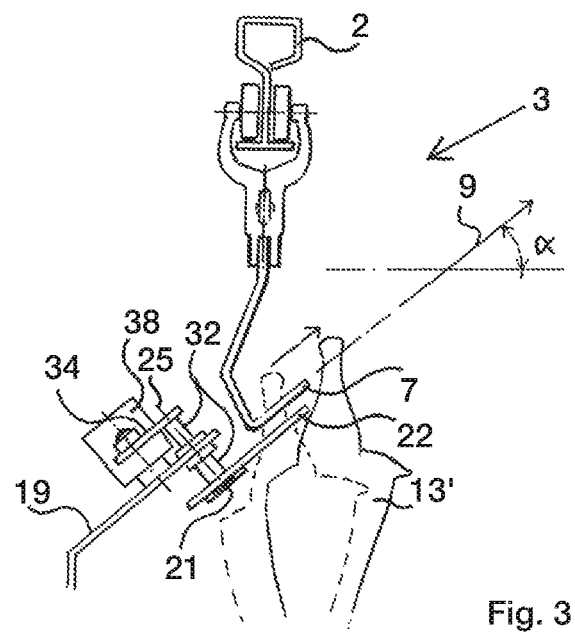
FIG. 3 is a view along the line III-Ill in FIG. 2d.
Figure 4:
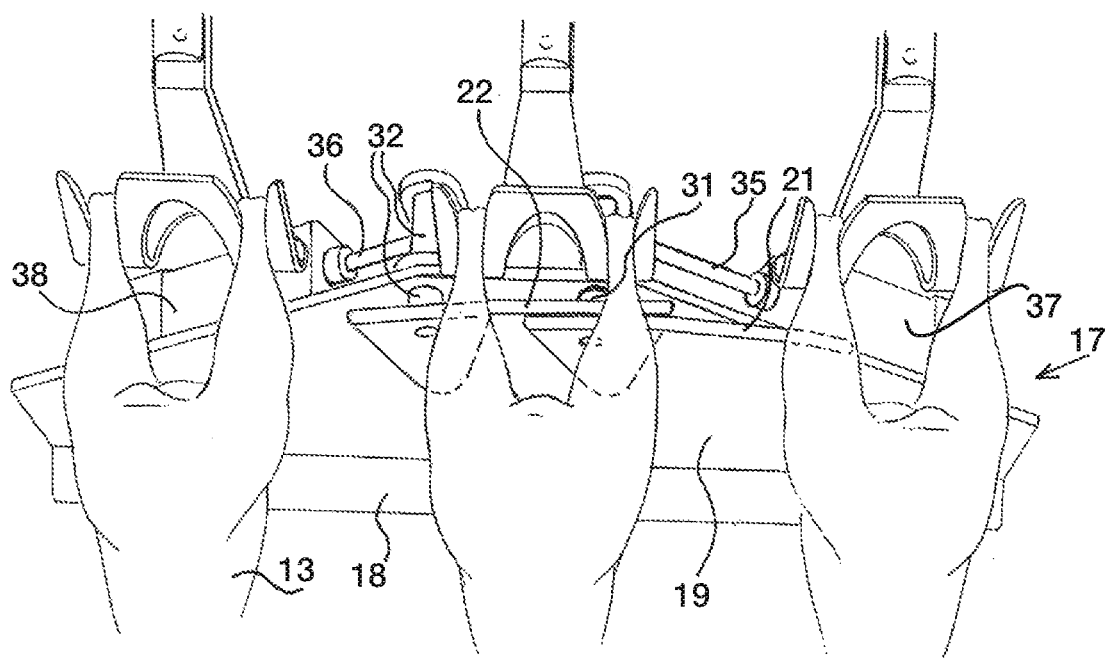
FIG. 4 shows the removing device from a different perspective.

Subsequently, as shown in FIG. 2c, also the second pusher arm 22 will be pivoted from the passive position to the active position thereof as soon as the downstream bird 13 offers space for this, which is before the bird 13' has fully passed the first pusher arm 21. The second pusher arm 22 is so positioned relative to the first pusher arm 21 that in the respective active positions thereof the end of the first pusher arm 21 joins the second pusher arm 22, as shown in FIG. 2c. As a result of pivoting to the active position, the second pusher arm 22 will also come to lie in the path of the legs 14 and take over the guiding function for the legs of the bird 13' from the first pusher arm and push the legs 14 further in the direction of the open ends 11 of the slots 8 until the legs 14 come clear of the slots 8. Because the angle that the second pusher arm 22 takes up relative to the conveying direction 24 in the active position is larger than the corresponding angle of the first pusher arm 21, the legs 14 are more quickly guided in lateral direction by the second pusher arm 22 than by the first pusher arm 21. This reduces the cycle time. The inclination of the first pusher arm 21 in the active position is limited on account of mass inertia effects and the possible need to overcome also friction forces that act between the legs 14 and the tapered slots 8. If the legs 14 are guided in lateral direction too quickly by the first pusher arm 21, the risk of damage to the legs 14 will be greater.

Figure 9:
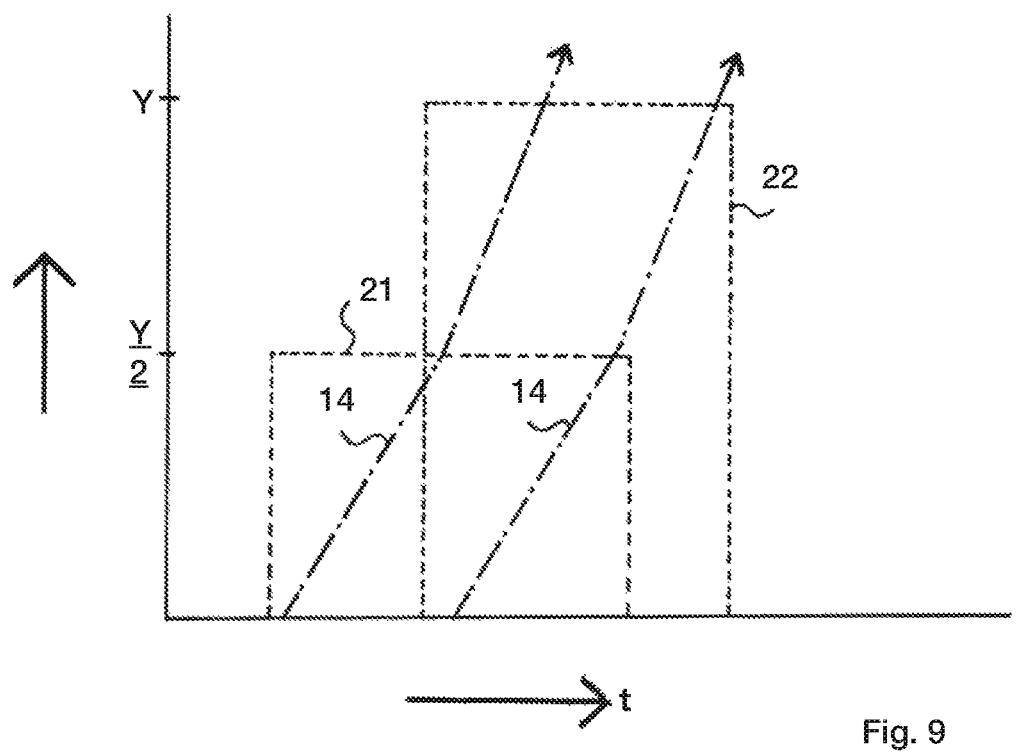
FIG. 9 shows a time-displacement diagram associated with FIGS. 2a-2d.

The above process is also shown in the diagram of FIG. 9, in which the vertical axis shows the lateral movement (i.e. in horizontal direction perpendicular to the direction of movement 24) of (the ends of) the first and the second pusher arm 21, 22 and also of the legs 14 of a bird 13'. As regards the value y indicated on the vertical axis, y-I×cos(α) applies. Typically, the interval between the forward movement of the first pusher arm 21 and the return movement of the second pusher arm 22 could be 275 ms.

Once the upstream leg 14 of the bird 13' has fully passed the first pusher arm 21, the first pusher arm 21 will pivot back again from the active position to the passive position as shown in FIG. 2d. In this way the upstream bird 13, which, as determined by the central control system, is not to be removed from the associated product carrier 3 by the removing device 15 in this example, is prevented from coming into contact with the first pusher arm 21.

Once the upstream leg 14 of the bird 13' has fully passed the second pusher arm 22 as well, the second pusher arm 22 will also pivot back to the passive position, so that the upstream bird 13''' will not impeded by the second push arm 22, either. The starting situation shown in FIG. 2a is then reached again.

Incidentally, in the situation in which a bird 13 in the adjacent upstream product carrier 3 must be removed from said product carrier 3 as well, the pusher arms 21, 22 need not pivot back to their respective passive positions. Said pivoting back will only happen in a situation in which a bird 13 in an adjacent upstream product carrier 3 need not be removed from said product carrier 3.

Figure 5:
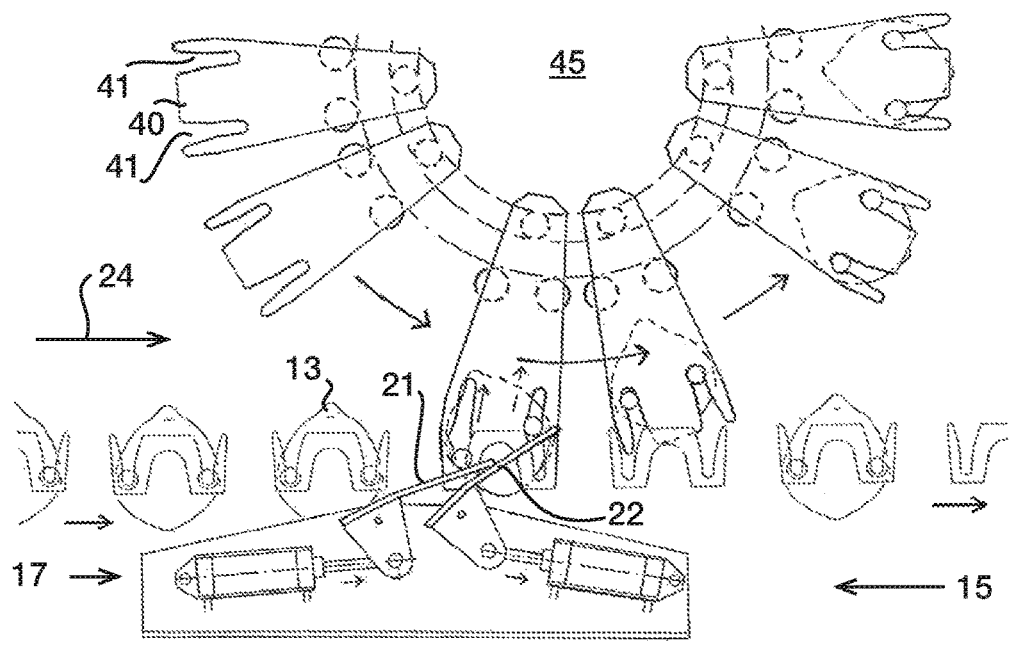
FIG. 5 is a view of the removing device as shown in the preceding figures, used in a transfer station.

Once a bird 13 has been removed from a product carrier 3 by the removing device 15, the bird can fall into a collecting bin, for example, under the influence of the force of gravity. Alternatively it is also possible to use the removing device 15 with a so-called transfer device as shown in FIG. 5. In slaughterhouses it may desirable for various reasons to transfer a bird 13 from one product carrier to another product carrier, usually of a different type, possibly from a product carrier of a transfer station, such as the one indicated at 40 in FIG. 5. The product carrier 40 forms part of an transfer station 45 as described in detail in European publication EP 1 848 282 B1. Like the product carrier 3, the product carrier 40 has two slots 41, which are spaced the same distance apart as the slots 8 of a product carrier 3. The product carrier 40 forms part of a carousel, to which product carrier a parallel, synchronised movement with the product carrier 3 is imparted at the location of the removing device 15, during which movement slots 41 of the product carrier 40 and slots 8 of the product carrier 3 are temporarily aligned. Using the pusher arms 21, 22, a bird is pushed from the product carrier 3 into the product carrier 40 in a manner already explained in the foregoing. It is conceivable in that regard for the hook parts 5 to be slightly tilted about a tilt axis that extends parallel to the conveying direction 24, so that the associated slot parts will have a flatter orientation, making it easier to remove birds 13 from the product carriers 3.

Figure 6:
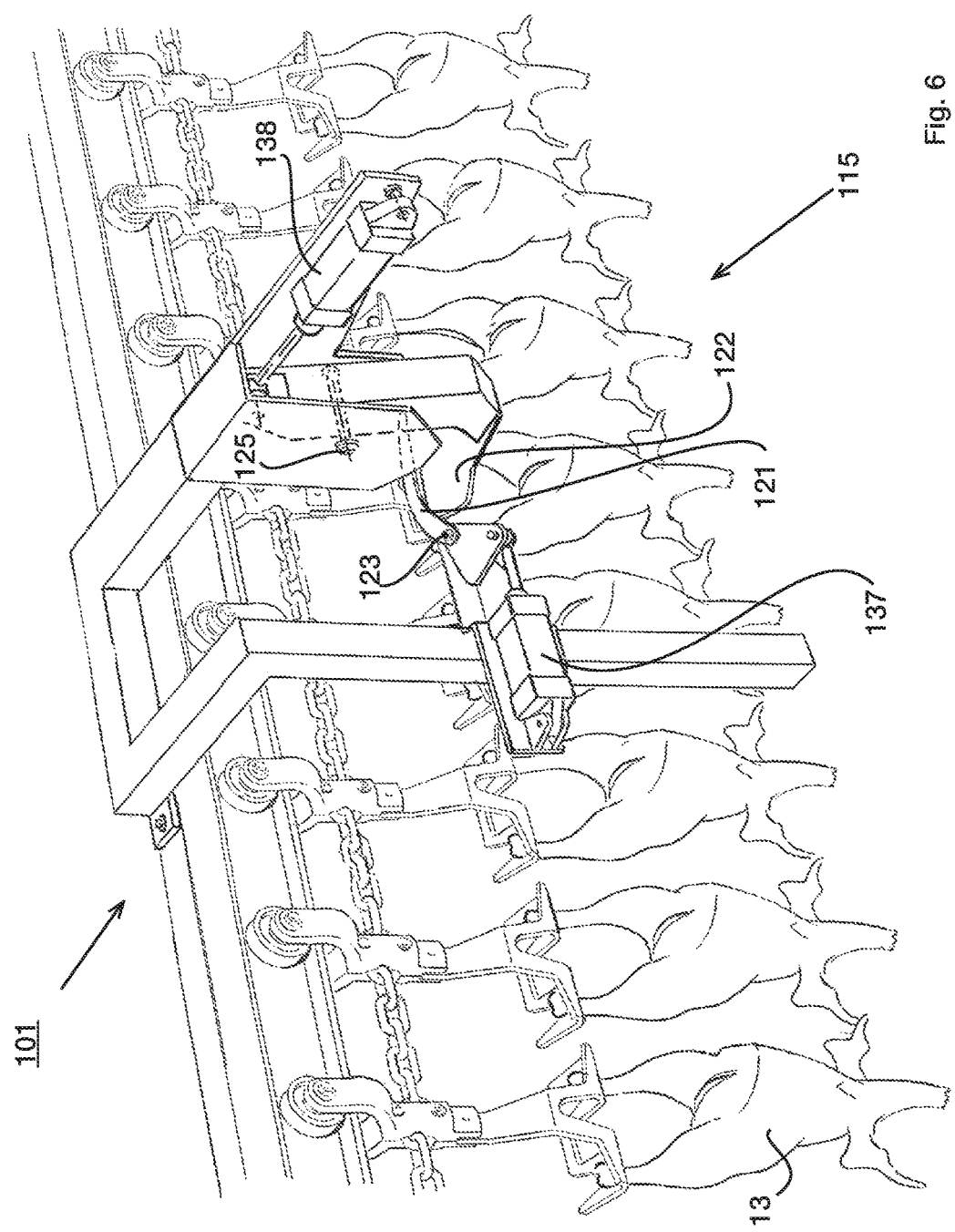
FIG. 6 shows a part of a slaughter line according to a second embodiment of the invention, including the associated removing device.

FIG. 6 relates to a second embodiment of the present invention. Insofar as elements of the second embodiment correspond to elements of the first embodiment shown in FIGS. 1-5, corresponding reference numerals will be used.

Figure 8:
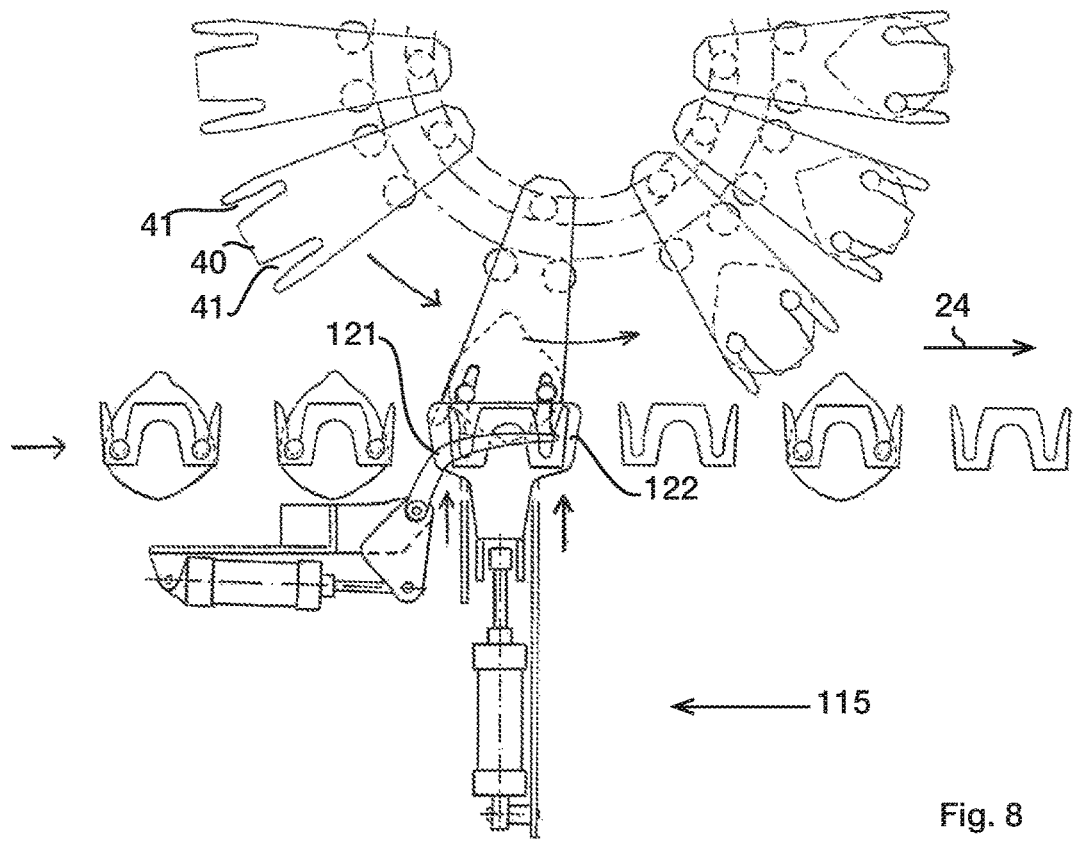
FIG. 8 shows the removing device of FIG. 6, used in a transfer station.
Figure 7A:
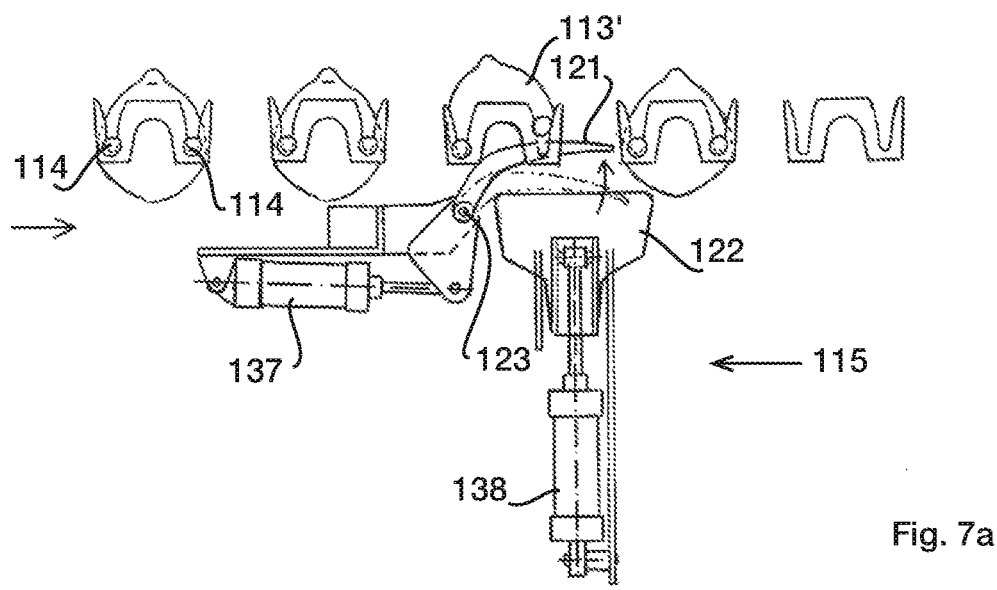
FIGS. 7a-7c show in top plan view three successive stages of the ejection of a bird from a product carrier by means of the removing device.
Figure 7B:
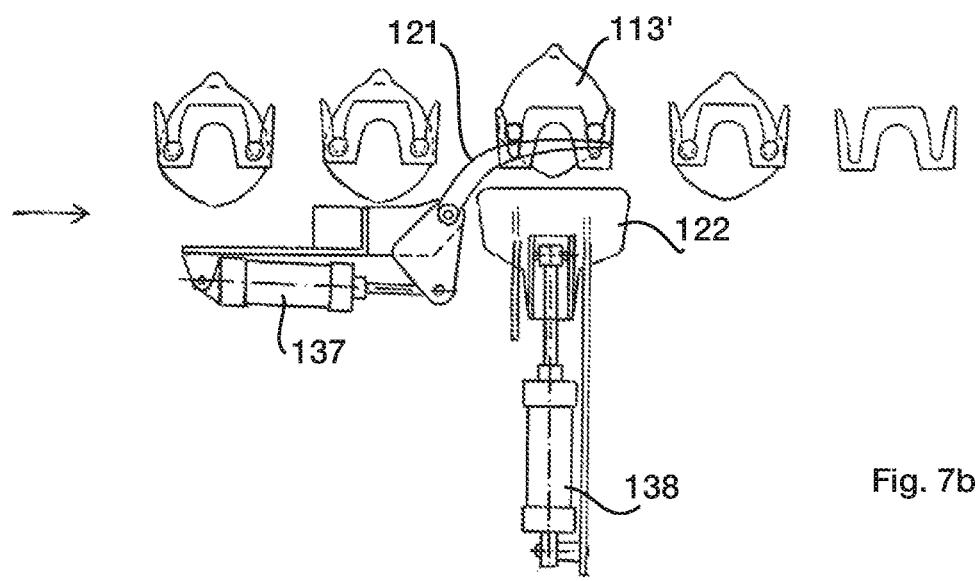
Figure 7C:
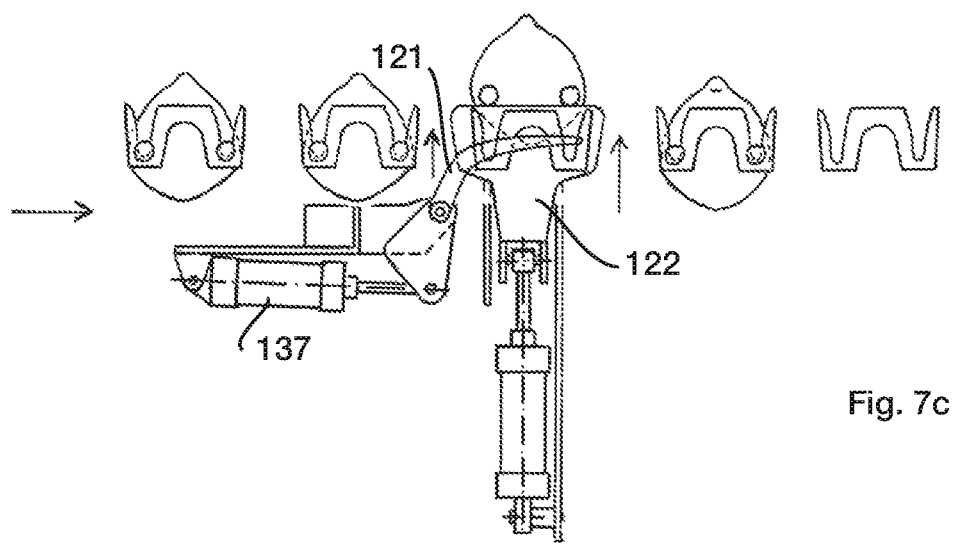

FIGS. 6-8 show a slaughter line 101, or at least a part thereof that is relevant to the invention. The slaughter line 101 comprises a removing device 115. The removing device 115 comprises a pusher arm 121 which can be made to pivot to and fro between a passive position (FIG. 6, FIG. 7a in dotted line) and an active position (FIGS. 7a-7c) about a pivot axis 123 by suitable actuation of the cylinder 137.

The removing device 115 further comprises a pusher arm 122 which will be indicated hereinafter by the term "ejector arm" 122. The ejector arm 122 can be made to pivot to and fro between a passive position (FIGS. 6, 7a, 7b) and an active position (FIG. 7c) about a pivot axis 125 that extends parallel to the conveying direction 24 by suitable actuation of the cylinder 138. An alternative embodiment of a pusher arm as the pusher arm 122 is described in EP 819 382 B1, in particular with reference to FIG. 18 thereof.

The selective removal of a bird 113' from a product carrier 3 by means of the removing device 115 will now be described hereinafter.

The starting situation is the situation shown in FIG. 6 or FIG. 7a insofar as the pusher arm 121 is in the passive position illustrated in the dotted line. In said starting position, also the ejector arm 122 is in the passive position. The control system of the slaughter line 101 delivers the command to the control unit of the removing device 115 that a bird 113' must be removed from the associated product carrier 3. As soon as the bird in the adjacent downstream product carrier 3 offers space for this, the pusher arm 121 will move from the passive position to the active position. In the situation shown in FIG. 7a, the upstream leg 114 of the bird 113' will be pushed from the lower end 12 of the slot 8 in question to approximately halfway the length of said slot 8 by and during the movement of the pusher arm 121 to the passive position. During the movement of the slaughter line, the downstream leg 114 of the bird 113' will strike the pusher arm 121 and be pushed aside in the direction of the open end 11 of the associated slot 8, also to a position approximately halfway the length of said slot 8. Once the bird 113' is subsequently positioned directly opposite the ejector arm 122 (FIG. 7b) as a result of the movement of the slaughter line, the ejector arm 122 will be briefly moved from the passive position to the active position and back to the passive position again. During said movement from the passive position to the active position, the ejector arm 122 pushes, more specifically bumps, the legs 114 of the bird 113' toward the open end 11 out of the slots 8 (FIG. 7c). The pusher arm 121 will then pivot back to the passive position. This can take place at the same time or shortly after the ejector arm 122 has pivoted back to the passive position, but it is also conceivable for the pusher arm 121 to pivot back to the passive position again (shortly) before the ejector arm 122 moves to the active position.

Figure 10:
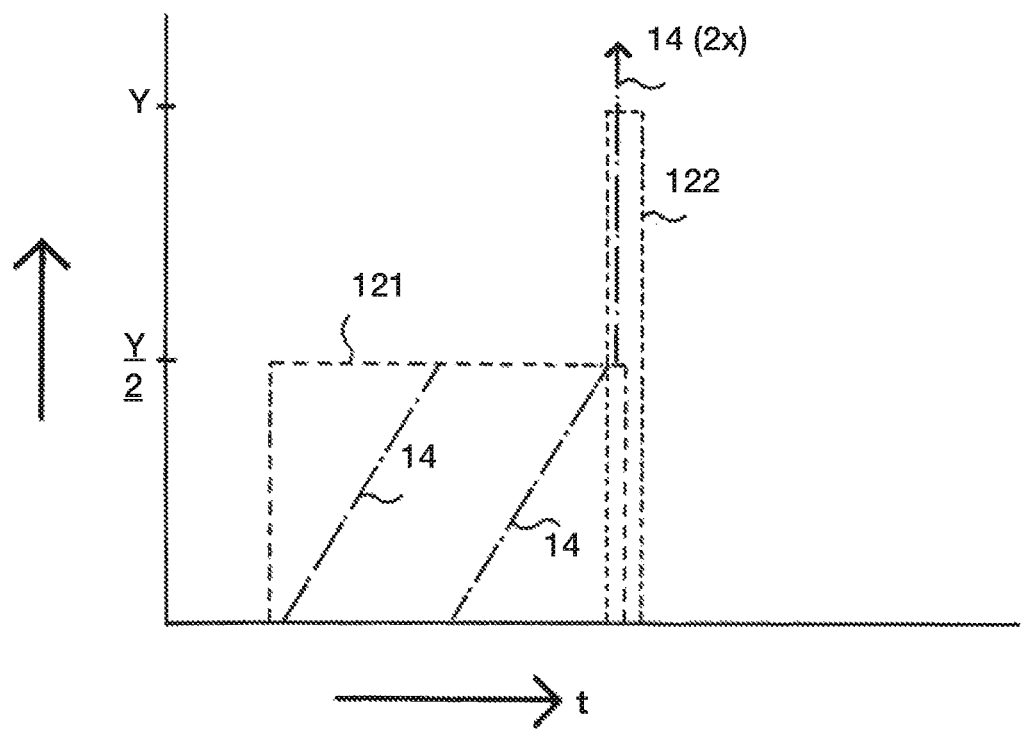
FIG. 10 shows a time-displacement diagram associated with FIGS. 7a-7c.

The above process is also shown in the diagram of FIG. 10, in which the vertical axis indicates the lateral movement (i.e. in horizontal direction perpendicular to the direction of movement 24) of the end of the pusher arm 121 and of the ejector arm 122 and also of the legs 14 of a bird 13'. The legs 14 move jointly with the ejector arm 122 during the stroke from the active position to the passive position. Although the return movement of the pusher arm 121 to the passive position takes place between the forward movement of the ejector arm 122 and the return movement of the ejector arm 122 in the diagram, said movement could also take place shortly before the forward movement of the ejector arm 122 or after, for example shortly after, the return movement of the ejector arm 122. Typically, the interval between the forward movement of the first pusher arm 121 and the return movement of the ejector arm 122 could be 200 ms.

FIG. 8 shows how the removing device 115 can also be used for transferring birds in a transfer station comparable to the one shown in FIG. 5.

In the foregoing, the invention has been explained by means of an example in which birds, such as chickens, are processed. The invention is also suitable for use with other types of animals for slaughter, for example fish. A product carrier that might be used with fish, for example, is described in European patent application EP 13183012.7.

The invention claimed is:

1. A combination of a conveying device for conveying slaughter animals suspended from product carriers of the conveying device, during which conveyance the slaughter animals describe a path, and a removing device disposed along said path for removing selected slaughter animals from the product carriers, the conveying device comprising a guide extending along a transport path, product carriers for the slaughter animals, which are movable in a direction of movement along the guide, each product carrier comprising at least one groove inclined according to a direction of inclination for holding at least one held part of a slaughter animal therein, wherein the at least one groove has an open upper end and a lower end and is laterally oriented relative to the conveying device, at least at the location of the removing device, the removing device comprising a pusher element, moving means for moving the pusher element to and from between a passive position, in which the pusher element is located outside the path of slaughter animals, and an active position, in which the pusher element is located in the path of at least one held part of a selected slaughter animal in the active position, or at least during movement from the passive position to the active position, for pushing the at least one held part of the selected slaughter animal from the at least one groove of a product carrier via the upper open end of said at least one groove, wherein the removing device comprises a further pusher element as well as further moving means for moving the further pusher element to and fro between a further passive position, in which the further pusher element is located outside the path of slaughter animals, and a further active position, in which the further pusher element is located in the path of the at least one held part of the selected slaughter animal, or at least during its movement from the further passive position to the further active position, for pushing the at least one held part of the selected slaughter animal from the lower end, in the direction of the upper end, to an intermediate position, wherein the pusher element is designed to push the at least one held part of a slaughter animal from the intermediate position, via the upper end of the at least one groove of a product carrier, out of said at least one groove in the active position or during its movement from the passive position to the active position.

2. A combination according to claim 1, wherein the pusher element is pivotable about a pivot axis between the passive position and the active position.

3. A combination according to claim 2, wherein the pivot axis extends parallel to the direction of movement.

4. A combination according to claim 2, wherein the pivot axis extends perpendicular to the direction of movement.

5. A combination according to claim 4, wherein the pivot axis extends perpendicular to the direction of inclination.

6. A combination according to claim 4, wherein the pivot axis is provided on an upstream side of the pusher element.

7. A combination according to claim 1, wherein the direction of inclination includes an angle that ranges between 40 degrees and 50 degrees with a horizontal line.

8. A combination according to claim 1, wherein the further pusher element is pivotable about a further pivot axis between the further passive position and the further active position.

9. A combination according to claim 8, wherein the further pivot axis extends perpendicular to the direction of movement.

10. A combination according to claim 9, wherein the further pivot axis extends perpendicular to the direction of inclination.

11. A combination according to claim 1, wherein the further pusher element, in the further passive position thereof, is located at least partially upstream of the pusher element in the passive position thereof.

12. A combination according to claim 1, wherein the pusher element, at least in the active position thereof, and/or the further pusher element, in the further active position thereof, is/are designed for laterally guiding the at least one held part of a selected slaughter animal in the direction of the open end of the at least one groove of a product carrier during transport of the slaughter animal in the direction of movement, to which end the pusher element and/or the further pusher element comprise a guide surface and/or a further guide surface, respectively, wherein, seen in top plan view, the guide surface and/or the further guide surface include(s) an acute angle with the conveying direction in the active position and/or the further active position.

13. A combination according to claim 12, wherein the pusher element, in the active position thereof, and the further pusher element, in the further active position thereof, are designed for laterally guiding the at least one held part of a selected slaughter animal, wherein the angle which the guide surface includes with the conveying direction is larger than the angle which the further guide surface includes with the conveying direction.

14. A combination according to claim 12, wherein the pusher element comprises a guide surface as well as a connecting surface that joins the guide surface on the upstream side of the guide surface, which connecting surface, seen in top plan view in the active position of the pusher element, includes an angle with the conveying direction which is larger than the angle which the guide surface includes with the conveying direction.

15. A combination according to claim 1, wherein the combination comprises further product carriers which are movable along a further conveying path, which further product carriers are designed for taking over the slaughter animals whose at least one held part is being pushed out of the at least one groove by the pusher element via the upper end of the at least one groove of a product carrier.

16. A combination according to claim 1, wherein each product carrier comprises two grooves.

17. A combination according to claim 1, wherein the moving means and the further moving means are designed to carry out the following steps for the purpose of pushing the at least one held part of a slaughter animal out of the at least one groove
   A moving the further pusher element from the further passive position to the further active position for pushing the at least one held part of a slaughter animal from the lower end of the at least one groove in the direction of the upper end of the at least one groove to an intermediate position during step A or because of step A,
   B moving the pusher element from the passive position to the active position after step A for pushing the at least one held part of slaughter animal from the intermediate position, via the upper end of the at least one groove of a product carrier, out of said at least one groove during step B or because of step B,
   C moving the further pusher element from the further active position back to the further passive position after step B,
   D moving the pusher element from the active position back to the passive position after step B.

18. A method for operating a combination of a conveying device and a removing device according to claim 1, comprising the steps of
   A moving the further pusher element from the further passive position to the further active position for pushing the at least one held part of a slaughter animal from the lower end of the at least one groove in the direction of the upper end of the at least one groove to an intermediate position during step A or because of step A,
   B moving the pusher element from the passive position to the active position after step A for pushing the at least one held part of slaughter animal from the intermediate position, via the upper end of the at least one groove of a product carrier, out of said at least one groove during step B or because of step B,
   C moving the further pusher element from the further active position back to the further passive position after step B,
   D moving the pusher element from the active position back to the passive position after step B.

19. A method according to claim 18, wherein step D is carried out after step C.

20. A method according to claim 18, wherein the length of the time interval between steps A and C and/or the length of the time interval between steps B and D is at most 80%, more preferably at most 75%, of the length of the time interval between steps A and D.

21. A method according to claim 18, wherein step B is carried out simultaneously with or before step C.

22. A method according to claim 18,
   wherein the combination comprises further product carriers which are movable along a further conveying path, which further product carriers are designed for taking over the slaughter animals whose at least one held part is being pushed out of the at least one groove by the pusher element via the upper end of the at least one groove of a product carrier,
   wherein a slaughter animal is taken over from a product carrier by a further product carrier during step B or between steps B and D.

23. A method according to claim 18, wherein the slaughter animal is a slaughter bird.

24. A removing device for use in a combination according to claim 1, comprising a pusher element, moving means for moving the pusher element to and fro between a passive position, in which the pusher element is located outside the path of slaughter animals, and an active position, in which the pusher element is located in the path of at least one held part of a selected slaughter animal in the active position, or at least during movement from the passive position to the active position, for pushing the at least one held part of the selected slaughter animal out of the at least one groove of a product carrier via the upper open end of said at least one groove, wherein the removing device comprises a further pusher element as well as further moving means for moving the further pusher element to and fro between a further passive position, in which the further pusher element is located outside the path of slaughter animals, and a further active position, in which the further pusher element is located in the path of the at least one held part of the selected slaughter animal in said further active position, or at least during its movement from the further passive position to the further active position, for pushing the at least one held part of the selected slaughter animal from the lower end, in the direction of the upper end, to an intermediate position, wherein the pusher element is designed to push the at least one held part of a slaughter animal from the intermediate position, via the upper end of the at least one groove of a product carrier, out of said at least one groove in the active position or during its movement from the passive position to the active position.

\* \* \* \* \*